(12) United States Patent
Kawai et al.

(10) Patent No.: US 7,874,497 B2
(45) Date of Patent: Jan. 25, 2011

(54) TEMPERATURE CONTROL SYSTEM FOR MACHINE TOOL

(75) Inventors: Tomohiko Kawai, Yamanashi (JP);
Kenzo Ebihara, Yamanashi (JP);
Hiroshi Minami, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 380 days.

(21) Appl. No.: 12/172,736

(22) Filed: Jul. 14, 2008

(65) Prior Publication Data
US 2009/0030560 A1 Jan. 29, 2009

(30) Foreign Application Priority Data
Jul. 26, 2007 (JP) ............................. 2007-194213

(51) Int. Cl.
*F24F 11/053* (2006.01)
*F24F 3/00* (2006.01)
*G05D 23/12* (2006.01)
*B23Q 11/12* (2006.01)

(52) U.S. Cl. .................. 236/1 C; 165/206; 82/900; 409/135

(58) Field of Classification Search .............. 236/1 C; 700/300; 409/135; 408/60, 61; 165/206, 165/294; 82/900
See application file for complete search history.

(56) References Cited

U.S. PATENT DOCUMENTS
6,089,797 A 7/2000 Chen et al.

FOREIGN PATENT DOCUMENTS
JP 2004-255494 9/2004

OTHER PUBLICATIONS
Extended EP Search Report for 08160059.5 dated Oct. 28, 2008.

*Primary Examiner*—Chen-Wen Jiang
(74) *Attorney, Agent, or Firm*—Lowe, Hauptman, Ham & Berner, LLP

(57) ABSTRACT

A temperature control system for a machine tool capable of quickly responding to an ambient temperature change. A mechanical section of the machine tool is surrounded by a machine cover. Gas of which temperature is controlled by a temperature controller is discharged from bearing portions of gas bearings in the mechanical section to a region surrounded by the machine cover through a pipe and a gas bearing channel. A branch pipe is provided for directly introducing a part of gas discharged from the temperature controller to a temperature sensor inside the machine cover. The temperature sensor measures the temperature of gas mixture obtained by mixing the gas introduced directly from the pipe with air inside the machine cover in a predetermined ratio. The result of measurement by the temperature sensor is fed back to the temperature controller to control the temperature of the gas supplied to the gas bearings.

3 Claims, 8 Drawing Sheets

TEMPERATURE CONTROL SYSTEM FOR MACHINE TOOL

RELATED APPLICATIONS

The present application is based on, and claims priority from, Japanese Application Number 2007-194213, filed Jul. 26, 2007, the disclosure of which is hereby incorporated by reference herein in its entirety.

BACKGROUND OF THE INVENTION

1. Field of the Invention

The present invention relates to a temperature control system for a machine tool that performs nanometer-order machining.

2. Description of Related Art

In an ultra-precision machine, such as a machine tool or a measuring device for nanometer-order machining or measurement, the ambient temperature influences the machining accuracy and measurement accuracy, thereby changing the machined or measured shape. High-precision temperature control is needed to suppress the influence of the ambient temperature.

In a machine tool shown in FIG. 8, the interior of a mechanical section 2 is networked with a channel for gas bearings. For precision machining, the mechanical section 2 and a controller 14 are installed in an air-conditioned room 15, and a partition 17 for the safety of an operator 16 is provided around them. The temperature of gas supplied to the gas bearings is kept constant by a temperature controller 6. The temperature controller 6 is provided with a mechanism that is supplied with gas such as compressed air from a compressor 18 and serves to heat and cool the supplied gas (see JP2004-255494A).

In order to keep the temperature of the gas for the gas bearings constant, as shown in FIG. 2, the gas temperature is detected by a temperature sensor 10a that is located in the temperature controller 6 or near its gas outlet and fed back to the temperature controller 6 to maintain the constant gas temperature.

In this system, the temperature sensor 10a of the temperature controller 6 is not configured to detect the temperature around the machine tool 1, so that it cannot be easily influenced by a slight temperature change around the machine tool. However, the controller 6 cannot cope with a substantial temperature change around the machine tool 1.

If a temperature sensor 10b is set on the surface of or inside the machine tool mechanical section 2, as shown in FIG. 3, the temperature of the gas for the gas bearings is controlled according to the temperature change of the mechanical section 2.

In general, however, the heat capacity of the machine tool mechanical section 2 is very large. If a temperature change is caused around the machine tool 1 or in the mechanical section 2 in the configuration of FIG. 3, therefore, it takes a very long time before the temperature can be kept constant by the temperature controller 6 and the gas for the gas bearings. Thus, satisfactory temperature control cannot be performed if the time constant is so large that the heat capacity of the machine tool mechanical section 2 is too large for the gas.

If the temperature inside the machine tool cover 3 is detected by means of a temperature sensor 10c that is located in a position inside the cover 3 and off the machine tool mechanical section 2, as shown in FIG. 4, the gas of which the temperature is detected by the temperature sensor 10c is gas that is discharged from the mechanical section 2 into the space inside the machine tool cover 3 after a bearing portion is passed by the gas having passed through a gas bearing channel 4.

In this case, the temperature inside the machine tool cover 3 that is measured by the temperature sensor 10c can be controlled to be fixed in coincidence with a target temperature. Since the gas that is supplied to the gas bearing changes the temperature to establish this state, however, the temperature of the mechanical section 2 also changes. Thus, the temperature change of the mechanical section 2 cannot be suppressed, that is, an original purpose cannot be achieved.

The machine tool is a large metal mass of which the heat capacity is too large, as mentioned before, so that its temperature control is easily retarded. To cope with this, anticipative temperature control should preferably be performed by forecasting a future temperature change of the machine tool mechanical section, based on the temperature of any other small-capacity portion than the mechanical section.

However, the temperature control of the machine tool mechanical section is difficult mainly because the temperature of the machine tool depends on both the respective temperatures of air inside the machine tool cover and the gas for the gas bearings, and because both these temperatures influence each other in a ratio appropriate to each individual machine tool.

SUMMARY OF THE INVENTION

The present invention provides a temperature control system for a machine tool, capable of quickly responding to an ambient temperature change with a reduced time constant for a temperature sensor portion, that is, with improved response to heating, based on the respective temperatures of gas in the machine tool and gas supplied to gas bearings.

A temperature control system of the present invention is provided for a machine tool having a mechanical section provided with gas bearings, and a machine cover surrounding the mechanical section. The temperature control system comprises: a temperature sensor arranged inside the machine cover and not in contact with the mechanical section; a temperature controller that heats/cools gas to be supplied to the gas bearings so that temperature of the mechanical section is kept constant; and a conducting pipe that conducts a predetermined part of the gas discharged from said temperature controller to be introduced directly to said temperature sensor.

The gas bearings may comprise air bearings using air as operating gas.

A flow rate of the conducting pipe may be adjusted so that a ratio between influences of temperature inside the machine cover and temperature of the gas discharged from the temperature controller upon temperature detected by the temperature sensor is equal to a ratio between influences of the temperature inside the machine cover and the temperature of the gas discharged from the temperature controller upon the temperature of the mechanical section.

According to the present invention, the temperature sensor detects temperature around the mechanical section and the temperature detection by the temperature sensor is influenced by temperature of the gas discharged from the temperature controller by introducing a part of the gas discharged from the temperature controller directly to the temperature sensor. Thus, the controllability is improved so that the temperature of the machine tool mechanical section can be kept constant. In consequence, the cost of air conditioning around the machine tool can be reduced.

According to the present invention, moreover, temperature sensors for controlling the temperature of the machine tool mechanical section to be constant need not be increased in number, so that the temperature control system is not complicated.

DETAILED DESCRIPTION

Figure 1:
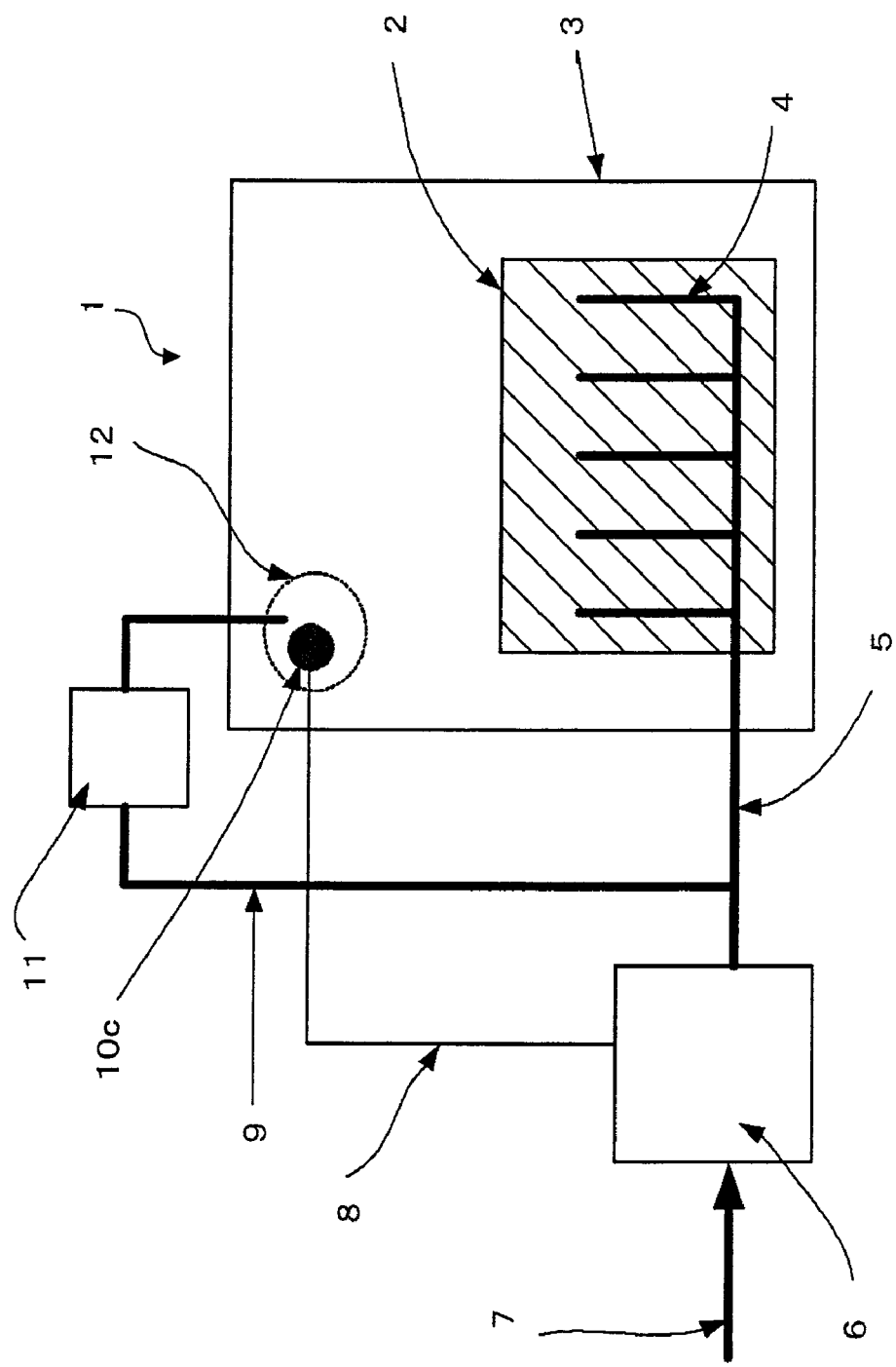
FIG. 1 is a diagram showing one embodiment of a temperature control system of the present invention.
Figure 2:
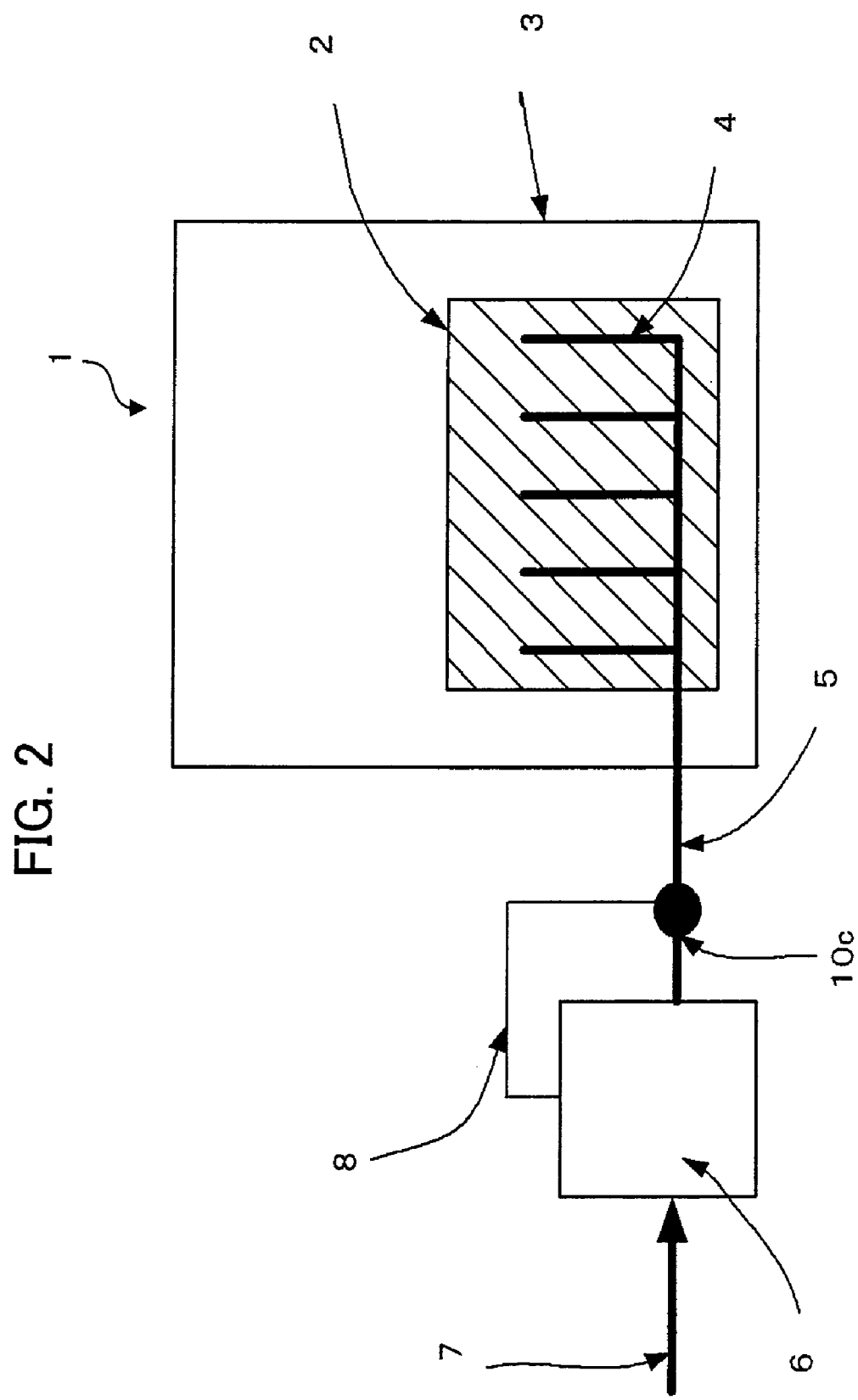
FIG. 2 shows an example of the temperature control system in which a prior art temperature sensor is located near an outlet of a temperature controller.
Figure 3:
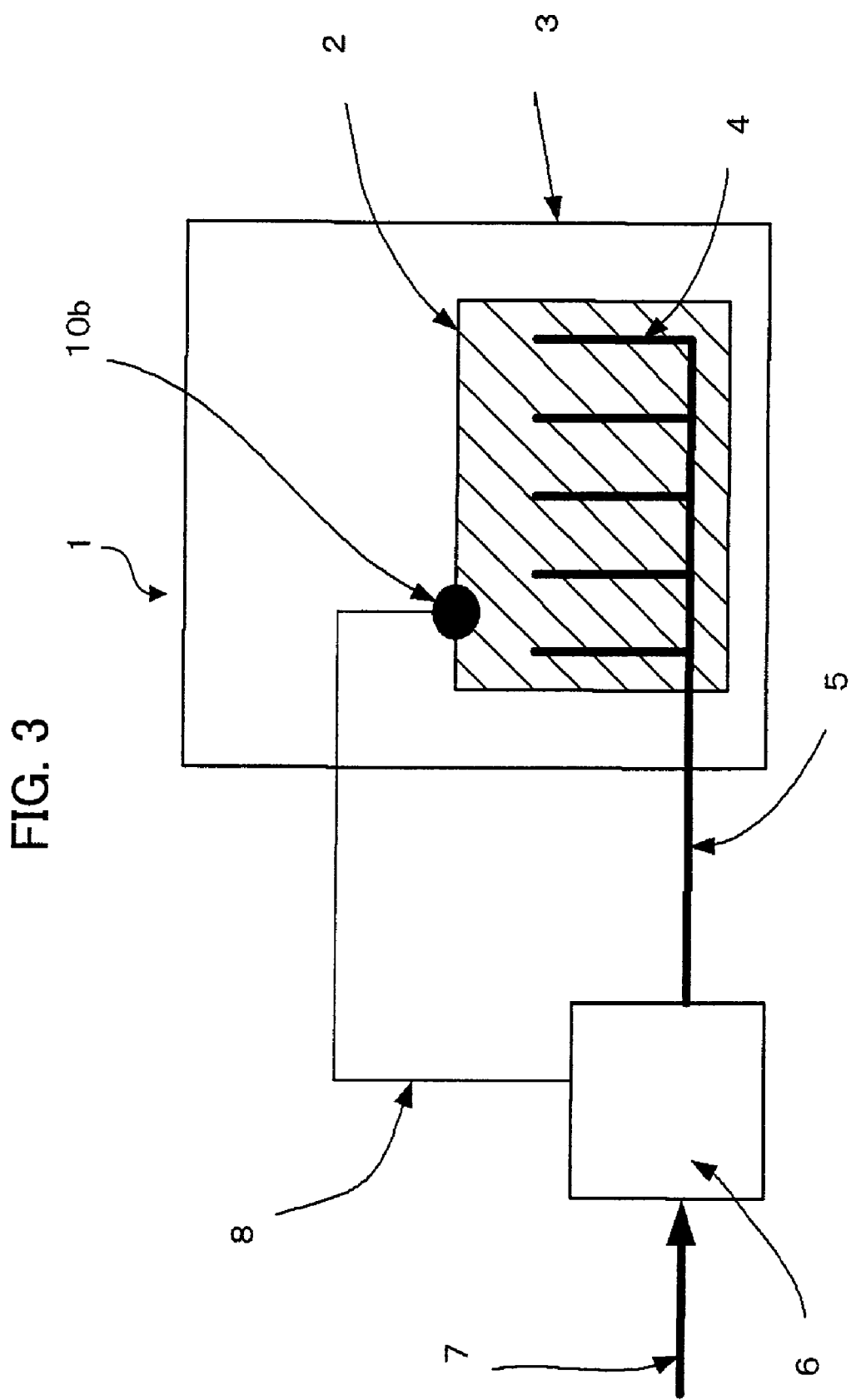
FIG. 3 shows an example of the temperature control system in which a temperature sensor is disposed on the surface of or inside a machine tool mechanical section.
Figure 4:
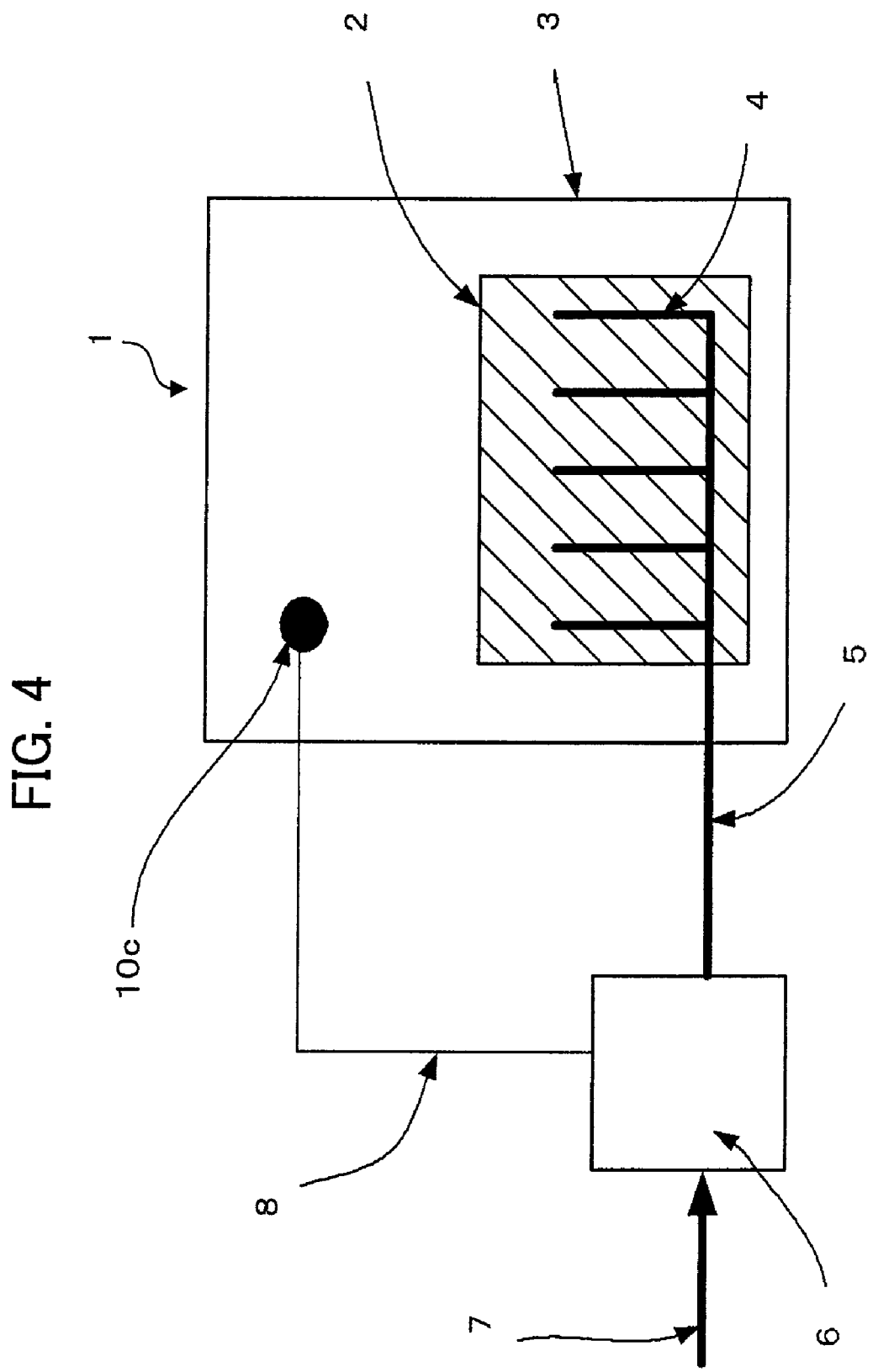
FIG. 4 shows an example of the temperature control system in which a temperature sensor is disposed in a position inside the machine tool cover and off the machine tool mechanical section.
Figure 8:
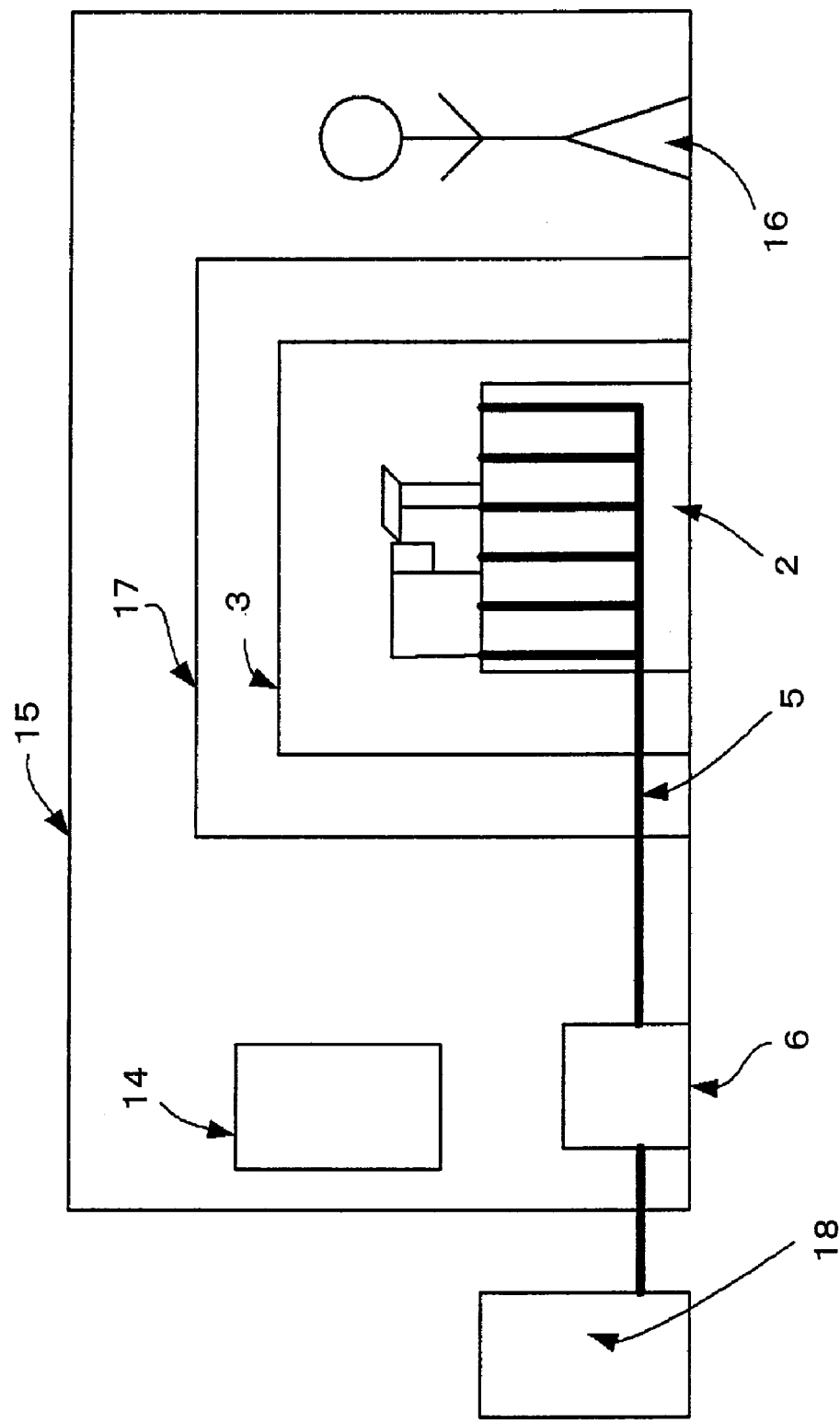
FIG. 8 is a diagram showing a machine tool installed in an air-conditioned room.

FIG. 1 is a diagram showing one embodiment of a temperature control system of the present invention. A machine tool 1 of this embodiment includes a machine tool mechanical section 2 for ultra-precision machining as a temperature control object. Normally, in performing ultra-precision, the machine tool is installed in an air-conditioned room, as shown in FIG. 8.

The machine tool 1 is provided with the machine tool mechanical section 2 and a machine tool cover 3 that covers it. The machine tool mechanical section 2 is surrounded by the machine tool cover 3, and the interior of the mechanical section 2 is networked with a gas bearing channel 4. Gas (e.g., air) from the gas bearing channel 4 is supplied to gas bearings (not shown). A temperature controller 6 is supplied with gas 7 such as air that is compressed by a compressor (see FIG. 8). The gas 7 that is subjected to temperature-control by the temperature controller 6 is discharged from bearing portions (not shown) of the gas bearings in the machine tool mechanical section 2 to a region surrounded by the machine tool cover 3 through a pipe 5 and the gas bearing channel 4.

A conducting pipe 9 is provided as a branch pipe to extend from a portion of the pipe 5 outside the machine tool cover 3. The branch pipe 9 conducts a part of the gas supplied from the temperature controller 6 to be directly introduced to be blown to a temperature sensor 10c that is arranged inside the machine tool cover 3 and not in contact with the machine tool mechanical section 2. Further, a variable-flow throttle valve 11 is provided in the branch pipe 9 in order to make a flow rate of the gas introduced to the temperature sensor 10c adjustable.

The opening of the variable-flow throttle valve 11 is set so that the gas flows at a predetermined flow rate such that the influence of the temperature inside the machine tool cover and the temperature of the gas supplied to the gas bearings on the temperature sensor 10c is equivalent to that of these temperatures on the machine tool mechanical section 2.

The temperature sensor 10c measures the gas temperature in a temperature measurement area 12 where the gas introduced directly from the branch pipe 9 is mixed with air inside the machine tool cover 3 in a predetermined ratio. A temperature detection signal measured by the temperature sensor 10c is fed back to the temperature controller 6 by means of a signal line 8.

With this arrangement, the temperature of the machine tool mechanical section 2 can be controlled based on a short time constant.

The following is a description of a qualitative description of the flow rate of the gas from the temperature controller 6 directly introduced to the vicinity of the temperature sensor 10c. It was empirically confirmed that a temperature change $\Delta M$ of the machine tool mechanical section 2, a temperature change $\Delta C$ of the gas inside the machine tool cover, and a temperature change $\Delta A$ of the gas supplied from the temperature controller 6 have relationships given by the following equations (1) and (2):

$$\Delta M = \Delta C \times a + \Delta A \times \beta, \quad (1)$$

$$a + \beta = 1 \, (0 < a < 1, 0 < \beta < 1), \quad (2)$$

where equation (1) holds only after the passage of sufficient time.

Values $\Delta C$ and $\Delta A$ on the right side of equation (1) are temperature variations of air or some other gas, which represent a change with high overheating response such that the heat capacity is very small and the time constant is short. Accordingly, $\Delta M$ can be guessed from current values of C and A according to equation (1) before the actual value M changes.

Thus, temperature control with a short time constant can be performed by controlling the temperature A of the gas supplied from the temperature controller 6 so that the right side of equation (1) is zero. If $\Delta M$ is zero, M is constant after all. Since the ratio between a and $\beta$ varies according to the configuration of the machine tool 1, it is previously set based on a measurement.

The following is a description of an example of a previous measurement method for measuring the ratio between influences of the gas inside the machine tool cover 3 and the gas for the gas bearings on the machine tool mechanical section 2 in order to set the ratio between a and $\beta$.

Figure 5:
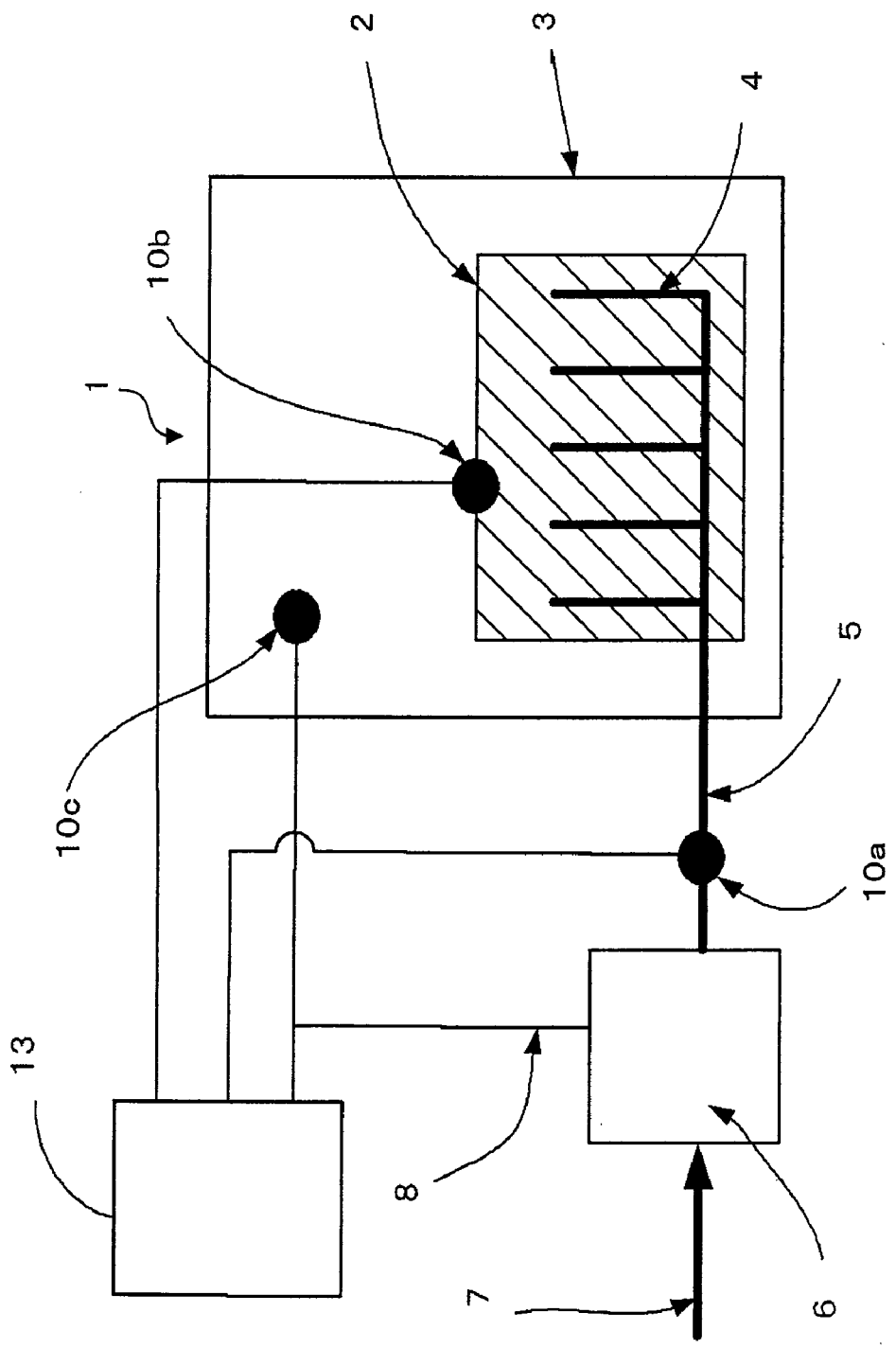
FIG. 5 shows an example of a measurement method for measuring the ratio between influences of gas inside the machine tool cover and gas for gas bearings on the machine tool mechanical section.

As shown in FIG. 5, a temperature sensor 10a is located in a channel for the gas discharged from the temperature controller 6; a temperature sensor 10b on the surface of or inside the machine tool mechanical section 2, and the temperature sensor 10c in a position inside the machine tool cover and off the mechanical section 2. Temperatures detected by the temperature sensors 10a, 10b and 10c can be measured by means of a measuring device 13.

Figure 6:
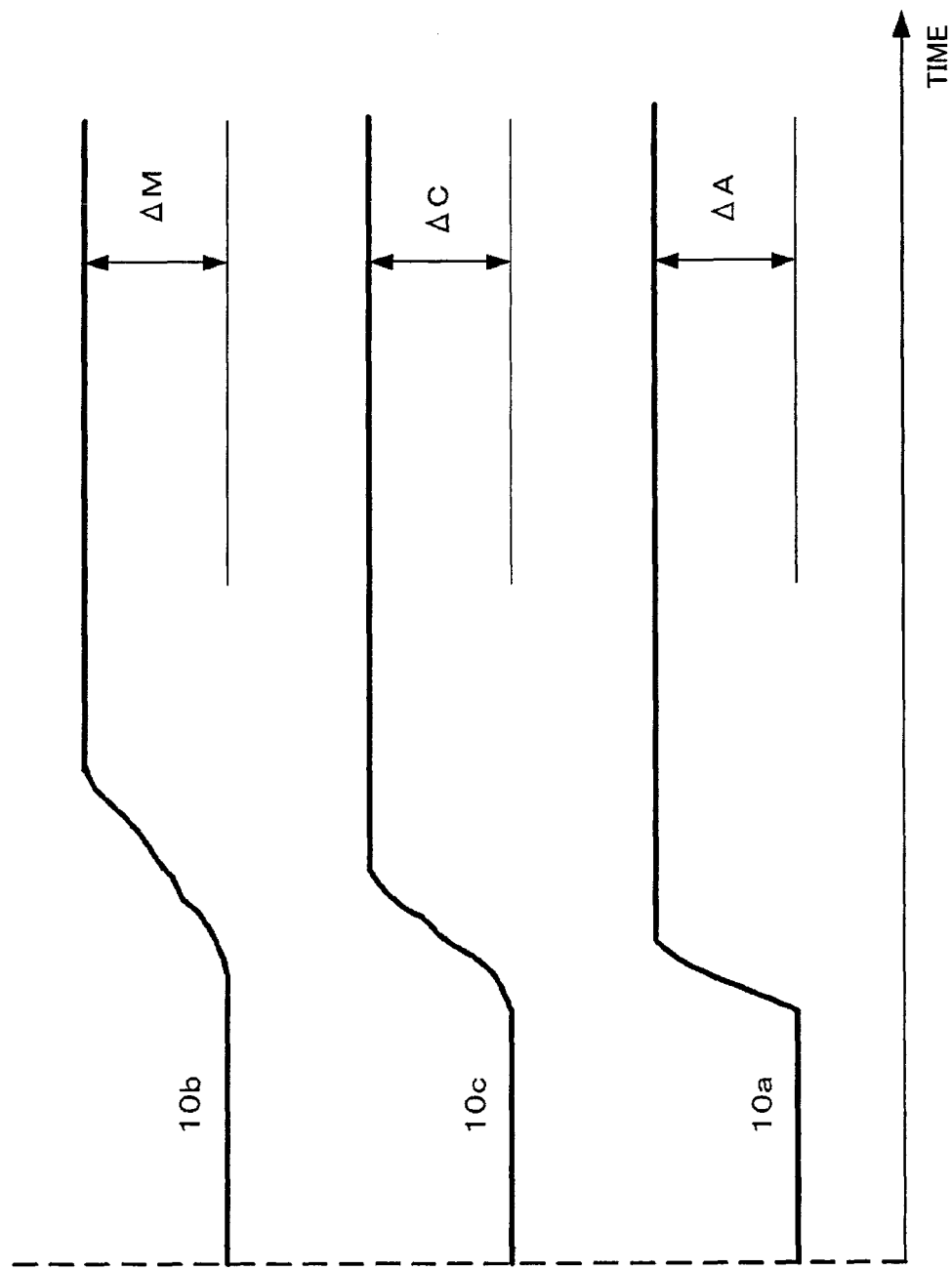
FIG. 6 shows an example of a measurement result obtained by the measurement method shown in FIG. 5.

If a set value of the temperature of the gas discharged from the temperature controller 6 is changed by $\Delta A$ in this state, the temperature of the machine tool mechanical section 2 and the temperature inside the machine tool cover 3 change correspondingly and reach a steady state in a given time. The changes of these temperatures are given by $\Delta M$ and $\Delta C$ (see FIG. 6), individually. The values a and $\beta$ can be determined by substituting the values $\Delta A$, $\Delta M$ and $\Delta C$ into equation (1) and solving the simultaneous equations (1) and (2).

Figure 7:
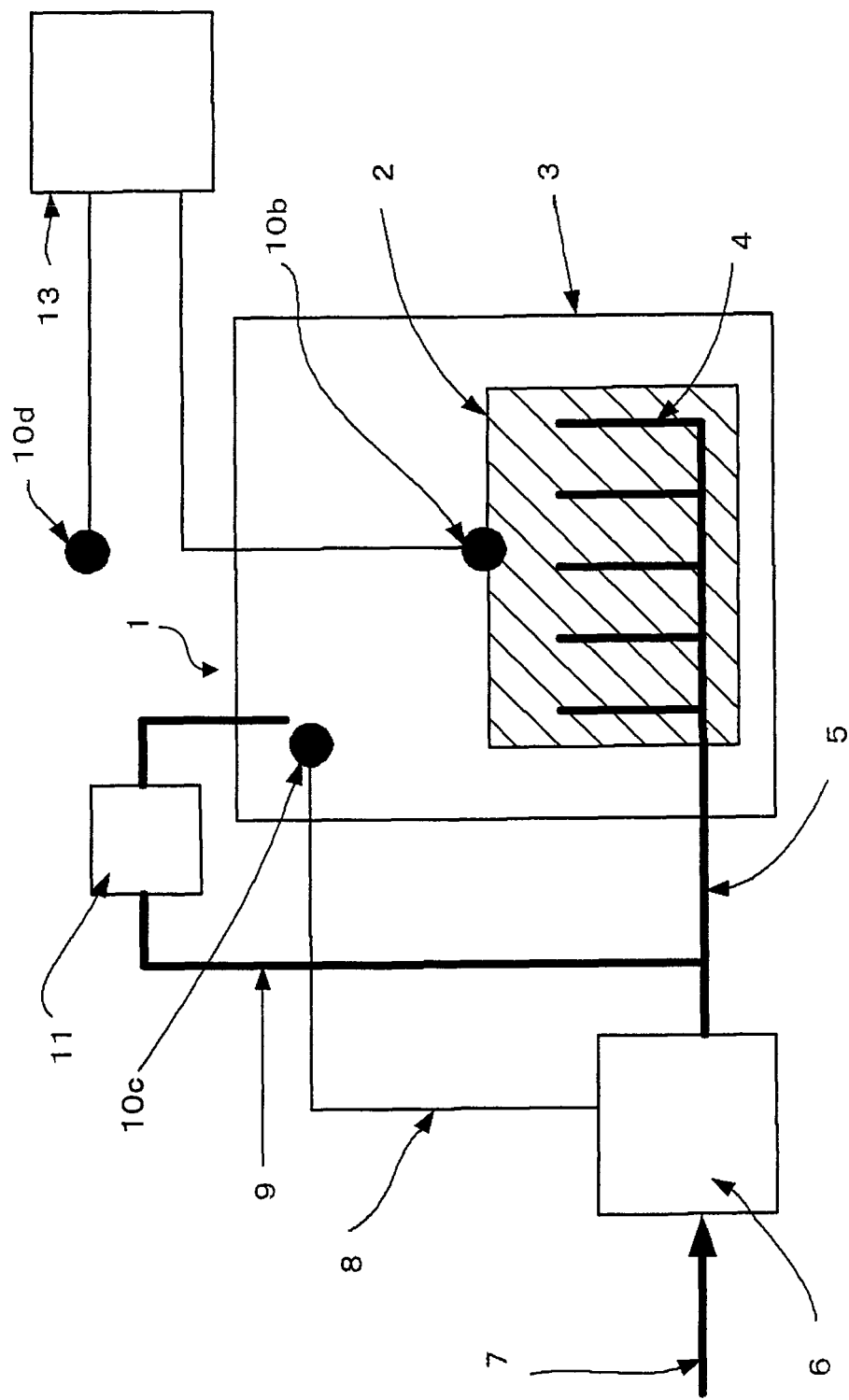
FIG. 7 shows an example of a method for determining an optimum opening for a variable-flow throttle valve.

The opening of the variable-flow throttle valve 11 is essential to actual setting. Therefore, the flow rate of the throttle valve 11 can be adjusted bit by bit to specify an optimum valve opening for the temperature control of the machine tool mechanical section 2 by measuring the atmospheric temperature and the temperature of the mechanical section 2 by means of temperature sensors 10*d* and 10*b*, respectively, as shown in FIG. 7, instead of specifically obtaining a and β.

Possibly, the ratio between a and β may be changed if the configuration of the machine tool 1 is modified by addition of an additional component so that the heat capacity of the machine tool mechanical section 2 is changed, or if the additional component includes gas bearings such that the gas is discharged into the region surrounded by the machine tool cover 3. In such a case, the opening of the variable-flow throttle valve 11 must be adjusted again to regulate the flow rate of the gas to be directly introduced to the temperature sensor 10*c*.

What is claimed is:

1. A temperature control system for a machine tool having a mechanical section provided with gas bearings, and a machine cover surrounding the mechanical section, said temperature control system comprising:

a temperature sensor arranged inside the machine cover and not in contact with the mechanical section;

a temperature controller that heats/cools gas to be supplied to the gas bearings so that temperature of the mechanical section is kept constant; and a conducting pipe that conducts a predetermined part of the gas discharged from said temperature controller to be introduced directly to said temperature sensor.

2. A temperature control system according to claim 1, wherein the gas bearings comprise air bearings using air as operating gas.

3. A temperature control system according to claim 1, wherein a flow rate of said conducting pipe is adjusted so that a ratio between influences of temperature inside the machine cover and temperature of the gas discharged from said temperature controller upon temperature detected by said temperature sensor is equal to a ratio between influences of the temperature inside the machine cover and the temperature of the gas discharged from said temperature controller upon the temperature of the mechanical section.

* * * * *